Dec. 8, 1936.                E. SMOLA                    2,063,765
                    AUTOMATIC STEERING OF SHIPS
                      Filed Jan. 24, 1934          2 Sheets-Sheet 1

INVENTOR
Emil Smola

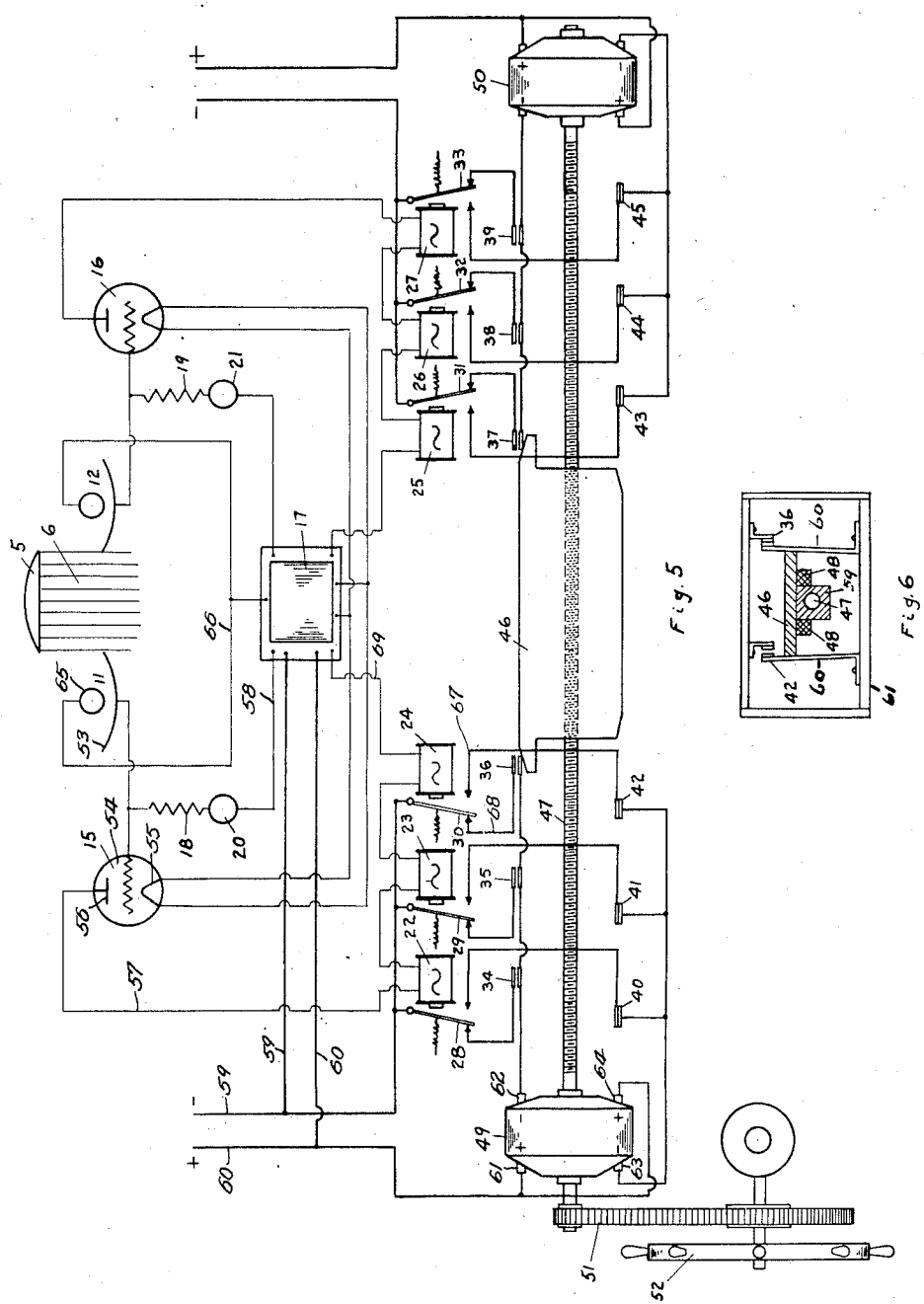

Patented Dec. 8, 1936

2,063,765

UNITED STATES PATENT OFFICE 2,063,765

AUTOMATIC STEERING OF SHIPS

Emil Smola, Newport News, Va.

Application January 24, 1934, Serial No. 708,099

1 Claim. (Cl. 172—282)

This invention relates to the automatic steering of ships, aircraft or any other object desired to be steered on a certain course.

It is a well known fact, that a ship steered on a certain course continually tends to deviate from her course, and rudder has to be applied by the steersman of various amounts and at various speeds, to bring her back to the former course.

The amount of rudder angle applied for each deviation is an important factor in properly steering the ship; too much rudder will cause a loss of speed, while too little will find her off her course most of the time. The right amount of rudder for a certain degree of deviation can be easily determined from practice, in steering her. If we now apply these amounts at the proper time, and not too late or too soon—the ship will be arrested in her "swing off" in the shortest time and with a minimum of rudder.

The object of this invention is to provide an automatic steerer capable to steer and apply rudder angles proportionate to the deviations from the course, at the proper time, and with speed proportionate to the velocity with which the ship is deviating from her course—also to return the rudder to center, as the ship approaches her former course.

The apparatus consists of the conventional magnetic liquid compass—to indicate directions, a lightsource—to cause a beam of light, a pair of photo electric cells and their circuits—to intercept the lightbeam when a deviation from the course occurs, and transform it into electrical energy, a series of sensitive relays in the aforesaid circuit—to make or break the circuit to the steering motor, and a circuit maker and breaker—to regulate and modify the flow of current to the steering motor.

Figure 5 upper part represents the photo electric cell circuits, central part represents the relays, and lower part the circuit maker and breaker or rudder angle regulator (top view).

Figure 6 represents a cross section of the circuit maker and breaker.

Figure 1:
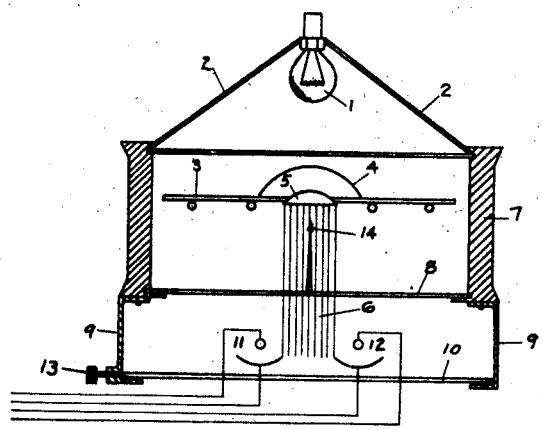
Figure 1 represents the magnetic compass with the light source above and photo cells under the compass bowl.
Figure 2:
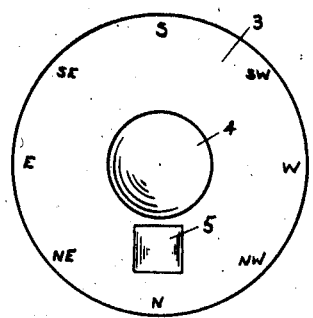
Figure 2 represents the magnetic compass card.

In Fig. 1 the magnetic compass is composed of the bowl 7, compass card 3, float 4, pivot 14, glass bottom 8 and a transparent glass face, all supported by a cardanic suspension (not shown), to keep it in a horizontal direction. The compass card 3 is cut out at the North point as shown in Fig. 2, and a condenser lens 5 is secured over it in a suitable aluminum frame; the compass card then is balanced for this extra weight.

Condenser lens 5 is of the cylindrical type, which focuses light into a straight line in air, however, due to the liquid in the compass bowl, the light received by lens 5 from lightsource 1 will be visible under the bowl as a lightbeam 6 about as wide as the lens itself, with well defined edges and slightly divergent.

Above the compass face, supported by supports 2 is a fixed central lightsource 1 consisting of a 50 watt electric bulb. Directly under the compass bowl and supported by four vertical supports 9 fastened to the bowl—is placed a brass dial 10. This dial is rotatable around its center and may also be rigidly fastened to the supports by setscrew 13. Dial 10 has two photo electric cells 11 and 12 mounted on its upper surface, the distance (horizontal) between the photo cells being exactly the width of the lightbeam 6 at this point. Connections from the cathodes and anodes of these tubes is taken to the amplifier tubes 15 and 16 (Fig. 5) located outside the compass housing in a suitable wall box, which also houses the transformer 17, resistances 18 and 19, potentiometers 20 and wiring of the circuit represented by light lines in Fig. 5.

It is evident, that when the ship is steered on a certain course, and dial 10 is rotated around by hand until lightbeam 6 in Fig. 1 falls exactly in between the two photo cells 11 and 12 and fastened in this position with screw 13—the cells are inoperative as long as the ship is on her course. Just as soon however as the ship goes off her course in either direction, the lightbeam 6 will sweep over one of the cells. The small electrical energy given off at this instance by the exposed tube may be increased through one or more stages of amplification, to control through a series of sensitive relays the current to a steering motor, which in turn will move the rudder in the opposite direction from that in which the ship is deviating from her course. This will bring the ship back to her original heading.

It should be borne in mind however, that in order to keep the ship on her course, it is not quite sufficient to move the rudder in the opposite direction from that in which she leaves her course. This operation (if the rudder angle is sufficiently large) will eventually bring her back, but will not keep her there. The amount of rudder (angle) and the speed in applying it, are important factors in checking the deviation and momentum of the vessel in the shortest possible way (time), and when she returns towards her course under the influence of the rudder thus given, this must be returned to center, and in this operation again speed and amounts of rudder taken off, are important.

As will be seen, the apparatus described below is capable not only to move the rudder one way or the other to oppose the deviations of the vessel (single stage steering), but will do this in stages proportionate to the deviation, and the speed in applying these stages will also be proportionate to the momentum (multistage steering).

This steering is based on the fact, that the electrical energy given off by the cathode of a given tube is directly proportional to the cathode surface illuminated.

Figure 4:
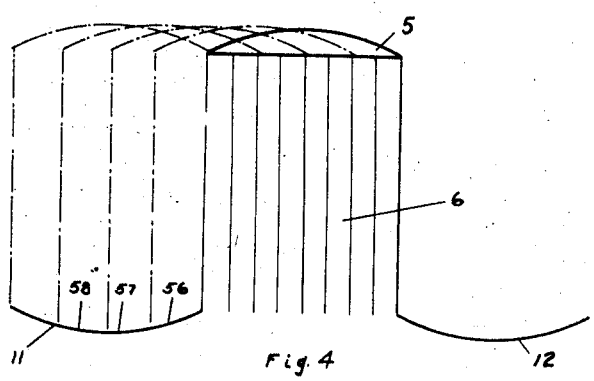
Figure 4 represents a graphical interpretation of the lightbeam passing over a cathode surface.

For illustration, in Fig. 4 the lightbeam 6 is gradually taken over cathode surface 11, illuminating in succession surfaces 56, 57, and 58. When only surface 56 is illuminated, say 15 microamperes are available in the plate circuit. If the lightbeam further advances over cathode 11 and surface 57 is also illuminated in addition to 56, 30 mcamp. are available in the plate circuit, and when lightbeam 6 further advances over cathode 11 and portion 58 is also illuminated in addition to 56 and 57, 45 mcamp. are available and so on. The plate circuit values are given only for illustration.

This imaginary division of the cathode surface into portions is of course limited, but it may be easily ten or more.

By using now several relays in series in the plate circuit of the same tube, these variable (increasing) energies given off by the same tube may be utilized in the following manner: Relays 22, 23 and 24 in series in the photo tube 11 circuit are identical relays of the break and make type, with micrometer screw adjustment for armature spring tension. Each relay is adjusted for different tension, so that 24 will attract (close) its armature 30 with 15 mcamp. in the plate circuit, relay 23 will attract its armature 29 with 30 mcamp. in the circuit, and relay 22 will do this with 45 mcamp. in the plate circuit. It is obvious then, that when lightbeam 6 illuminates cathode surface 56, only relay 24 will close. When the lightbeam advances over 57, relay 23 will also close, and upon advancing over 58, all three relays will be closed. If the lightbeam 6 recedes due to the return to the course and illuminates only surfaces 56 and 57, relay 22 will open (release its armature), but relays 23 and 24 remain closed. Upon a further recession of the lightbeam relay 23 will open, and when the lightbeam fully recedes from the cathode 11, all three relays will be open. At this time the ship is on her course.

The same takes place at relays 25, 26, 27 when the lightbeam sweeps over cathode surface 12 due to a deviation from the course in the opposite direction from that experienced before.

The part of Fig. 5 below the relays, represents the mechanism of the circuit maker and breaker or rudder angle regulator (viewed from top). The duty of this part of the apparatus is to intercept the flow of current through the closed relay to the steering motor, after a proportionate amount of rudder (angle) has been given by the steering motor to overcome a certain amount of deviation from the course. Its duty is also to return rudder to center when and while the ship returns to her course. It consists of the two reversible D. C. motors 49 and 50 mounted on the base 61 (Fig. 6), of the apparatus, and driving a screw 47, which is common to both motors. Screw 47 screws into a threaded carriage 59 shown in Fig. 6. The carriage 59 is guided between two horizontal guides 48 parallel to base 61. To the upper part of the carriage is fastened a "bakelite" plate 46 shaped as shown in Fig. 5. It is evident, that upon the screw 47 being turned by either of the motors, "bakelite" plate 46 will travel in a horizontal direction from one motor towards the other in either direction, depending in which direction the screw turns.

The "bakelite" plate 46 is flanked on both sides by a series of contact points 34, 35, 36, 37, 38, 39, 40, 41, 42, 43, 44, 45, carried on suitable spring blades 60 and secured to base 61. These contact points are paired with similar ones secured rigidly to the frame, and insulated from it.

As it will be seen from Fig. 5, as "bakelite" plate 46 is driven one way or the other on the screw 47, it will open or close these contacts in its path, and thereby make or break the circuit to the steering motors 49 and 50.

In operation the whole system functions in the following way:

Suppose we have been steering the ship by hand on a certain course, and we wish now to steer her automatically. With the ship steady on her course and the rudder in center, we turn on the current to lightsource 1 above the compass. Next we turn dial 10 by hand until the lightbeam falls between the two photo cells 11 and 12, and secure it in this position with screw 13. With the ship still on her coarse and rudder midships, we turn on the current to transformer 17 and motors 49 and 50, and release steering wheel 52.

At this particular point the light beam is exactly between the two photo cells, rudder is amidships, "bakelite" plate 46 in center (as shown in Fig. 5), and no current reaching either motor.

If the ship now deviates to the right, until lightbeam 6 advances over cathode surface 56 (which we might consider a one degree deviation to the right), the positive current developed by the cathode will decrease the negative bias of the grid in the respective amplifying tube, and the flow of current from filament to plate will increase. At this point 15 mcamp. current will be available in the plate circuit, which will cause relay 24 to attract its armature 30, permitting the current to reach motor 49 through the closed contacts at 42. The motor will now operate the rudder in the oposite direction from the deviation. The turning of the motor in this direction will also cause plate 46 to leave its central position and move towards the left in the picture, until it will break the circuit to motor 49 at contacts 42 as in Fig. 6. At this point the steering motor is stopped, vessel is off her course one degree, and rudder has been moved a proportionate amount to check the deviation, contacts 42 open and 36 closed.

If this amount of rudder was not sufficient (due to winds, currents etc.) to bring the vessel back to her course, she will continue to go off her course, and when lightbeam 6 illuminates 57, an additional amount of positive current will be given off by the cathode, the negative grid bias will be further decreased, the flow of current from filament to plate increased, 30 mcamp. will be available in the plate circuit, relay 23 will attract its armature, and the negative current will reach motor 49 via contacts 41. The motor will increase now the rudder angle another proportionate amount, and also drive 46 further towards the left, until it will break the circuit at 41, thereby stopping the steering motor and also 46, which in its travel towards the left has also closed the contacts at 35.

Upon a further deviation, the vessel will be three degrees off her course, cathode surface 58 will be illuminated, the negative grid bias will be further reduced, more current will flow from filament to plate, 45 mcamp. will be available in the plate circuit, relay 22 will attract its armature 28, negative current will reach motor 49 through contacts 40, motor will increase rudder angle, 46 will be driven towards the left until it breaks the motor circuit at 40, motor will stop, and contacts at 34 closed.

Under the influence of the rudder thus applied, the vessel begins to return to her course, and the lightbeam will move towards the port and recede from cathode surface 11. First portion 58 of the cathode becomes dark less positive energy given off by the cathode causes the grid to become more negative thereby decreasing the flow of current from filament to plate, and with only 30 mcamp. current available in the plate circuit now, relay 22 will release its armature 28, whereupon the negative current will reach the steering motor 49 through closed contacts at 34. The motor will be reversed in rotation, and will now return rudder towards center, and drive plate 46 towards the center or right until it opens contacts at 34, causing motor and plate to stop.

As the vessel still continues to return towards her former course, surface 57 becomes dark, relay 23 releases its armature 29, current reaches motor 49 through contacts 35, rudder is shifted towards center until circuit to motor is broken by 46 at contacts 35.

Upon a further return towards the course, surface 56 becomes dark, and no current will be emitted by the cathode. The grid's full negative value will be restored, and no current flowing from filament to plate, relay 24 releases its armature 30, negative current reaches motor 49 through closed contacts at 36, rudder angle will be decreased, plate 46 driven to the right, until circuit to motor is broken at 36. At this point vessel is again on her course, rudder amidships, plate 46 in center and both photo cells in dark.

Thus it will be seen, that the apparatus applies proportionate amounts of rudder. The speed in applying same is also proportionate to the momentum of the vessel, for, the faster the lightbeam 6 passes over the portions of the cathode surface, the faster will be the stages applied.

From the foregoing it will be noted, that while the ship was deviating towards the starboard, motor 49 was actually shifting the rudder away from center and back, also driving plate 46 and screw 47; motor 50 in the meantime was driven idle. Upon a deviation towards the port, motor 50 becomes the active motor, and will be actuated by relays 31, 32, 33, operated by cathode surface 12. Plate 46 will be then driven towards the right from the center in the same manner as it was driven towards the left, and will close or open the contacts adjacent to motor 50. These contacts 37, 38, 39 on one side and 43, 44, 45 on the other side operate in the same way as the contacts on the left side.

In the drawings 59 and 60 represent the line of supply feeding the primary winding of transformer 17 and also motors 49 and 50. The secondary winding of transformer 17 (not shown in drawings) is tapped for the various voltages required in the amplifying system. Lead 66 furnishes voltage to anode 65 of the photo tube 11, lead 58 across potentiometer 20 and resistor 18 furnishes negative bias to grid 54 of amplifying tube 15. The cathode 53 of photo tube 11 is hooked into the grid circuit of tube 15.

56 represents the plate of amplifying tube 15. Lead 57 connects the plate across relay coil windings 22, 23, 24 and lead 69 into transformer 17.

55 of tube 15 represents the filament, which is fed by the transformer.

When light beam 6 illuminates cathode 53 of photo tube 11, positive current will be emitted by the cathode, and since it is hooked into the negative grid circuit, it will reduce the negative grid bias interposed between filament 55 and plate 56 with the consequence that a larger amount of electrons (negative) will be attracted from the filament 55 by the positive plate 56, and an increased current will flow from transformer 17 through filament 55 over to plate 56, through lead 57 and relay coils 22, 23, 24 to lead 69 and back to transformer.

The magnitude of this plate current is proportional to the cathode surface 53 illuminated. When through increased illumination the plate current becomes sufficiently large enough and energizes solenoid 24 to a point where it overcomes the spring tension on armature 30, the armature will be attracted by it and pressed against contact 67. At this point the negative line current 59 passes over armature 30 to contact 67, over to closed contact 42 and reaches motor 49 at 63, whereas the positive line current 60 reaches motor 49 at 61. The motor will start up to turn in one direction moving 46 towards the left until 46 opens contacts 42 and breaks the circuit to motor 49.

If now the illumination on cathode 53 decreases, its positive current emittance also decreases, which in turn causes the grid 54 to become more negative. The more negative grid will decrease the flow of current from transformer 17 across filament 55 to plate 56, lead 57, solenoid coils 22, 23, 24, lead 69 and back to transformer. If—through decreasing illumination on cathode 53—the solenoid coils become sufficiently deenergized, solenoid 24 will release armature 30 and its spring tension will press it against contact 68.

Contacts 36 having been closed while 46 moved to the left, the negative current of supply line 59 will reach motor 49 over armature 30, contact 68, contact 36, at 62, while the positive current 60 will reach it at 64. Motor 49 will start up in a reversed direction moving 46 towards the right until contacts at 36 open and motor stops.

In the above I have traced the circuits of the first stage, that is, when the cathode 53 becomes sufficiently illuminated to cause relay solenoid 24 to attract its armature. When the illumination over cathode 53 increases and with it the plate current as explained before, solenoid 23 will attract armature 29, thereby again closing the circuit to motor 49. The flow of current will be now from 59 of the supply over armature 29, to contacts 41 to motor at 63, out at 61 and into 60 of the other side of the supply. Motor 49 will now move 46 towards the left until it breaks the motor circuit by opening contacts 41. Contacts 35 have been closed in the meantime.

With a decreasing illumination of the cathode 53, solenoid 23 will release armature 29 and motor 49 will be reversed. The current will now flow from one end of the supply at 59 across armature 29, closed contacts 35, into motor at 62, out at 64 and into the other end of the supply at 60.

The circuits of photo tube 12, amplifying tube 16 and motor 50 are identical to those of photo tube 11, amplifying tube 15 and motor 49.

To steer a new course, the power is simply switched off the transformer 17 and motors 49, 50, hand steering resumed, and ship brought to her new course by this means. After the vessel has been steadied on this course and rudder is amidships, photo cells rotated around by dial 10 to correspond with lightbeam and fixed by 13, power is switched on to transformer and motors and steering wheel released.

In the diagram enclosed the circuit maker and breaker is directly coupled to steering column by chain 51 (Fig. 5). This has been done to make the drawings less complicated.

For fine steering, the distance between the photo cells 11 and 12 (cathodes) should be exactly the width of the lightbeam 6. With such adjustment the ship might be steered to one half of a degree using a 9" magnetic compass card, and smooth sea.

Figure 3:
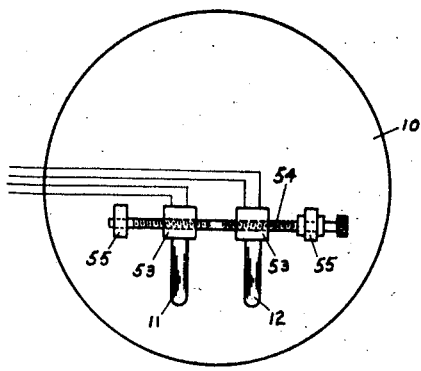
Figure 3 represents the platform or disc, on which the photo cells are mounted.

In heavy weather however such close adjustment (spacing) of the photo cells would not be advisable due to rolling and pitching of vessel. To overcome the sudden exposures of the cathodes to the lightbeam due to yawing, a weather adjustment is applied on dial 10, Fig. 3. This consists of a screw 54 threaded left and right from its center, and ending in a head, by which the screw is operated. The screw traverses and screws into each photo cell socketholder 53, and rests on bearings 55 respectively. The bearings are rigidly fixed to plate 10. By turning screw 54 one way or the other, the distance between photo cells 11 and 12 might be increased (for bad weather steering) or decreased (for fine weather steering) to suit weather conditions.

I claim:

In an automatic steering device, an opaque magnetic compass card carrying a noncentral light admitting portion pivoted in a support, a fixed lightsource above the compass card, a disc coaxially carried by the support below the compass card, means for adjusting said disc about its axis and fixing it in position, two spaced light sensitive elements carried by said disc, a group of relays responsive to the output of each of said light sensitive elements, said relays of each group having different characteristics so as to respond in succession to increasing currents, a rudder, electric motor means for driving said rudder, a block, means driven by the motor means for moving said block in either direction from a neutral position, electric circuits under the control of each group of relays when energized for energizing said motor means, contacts in said circuits opened in succession by the block, the contacts furthest from the neutral position being in the circuits controlled by the relays which are responsive to the largest currents, electric circuits under the control of the groups of relays when deenergized for energizing said motor means for returning said block to the neutral position, normally open contacts in said last named circuits closed in succession by the block during its travel from the neutral position, the contacts furthest from the neutral position being in the circuits controlled by deenergization of the relays which are responsive to the largest currents when energized, said normally open contacts being opened in succession by the block as it returns to its neutral position.

EMIL SMOLA.